(No Model.)

J. HOFMAN.
SHOE REST FOR DISPLAY FRAMES.

No. 424,555. Patented Apr. 1, 1890.

WITNESSES:
H. G. Phillips.
John E. Sharper

INVENTOR:
John Hofman
BY
Howard L. Osgood
his ATTORNEY

UNITED STATES PATENT OFFICE.

JOHN HOFMAN, OF ROCHESTER, NEW YORK.

SHOE-REST FOR DISPLAY-FRAMES.

SPECIFICATION forming part of Letters Patent No. 424,555, dated April 1, 1890.

Application filed May 10, 1889. Serial No. 310,323. (No model.)

*To all whom it may concern:*

Be it known that I, JOHN HOFMAN, of the city of Rochester, in the county of Monroe and State of New York, have invented certain new and useful Improvements in Shoe-Rests for Display-Frames, of which the following is a specification, reference being had to the accompanying drawings, in which—

Figure 1:
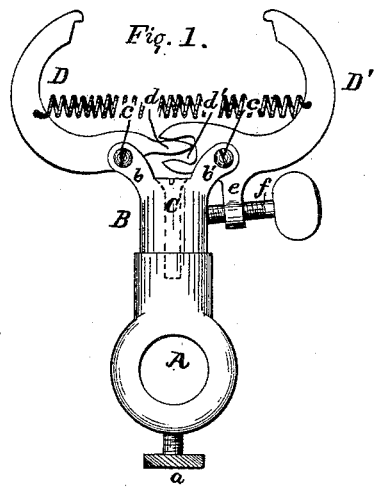
Figure 2:
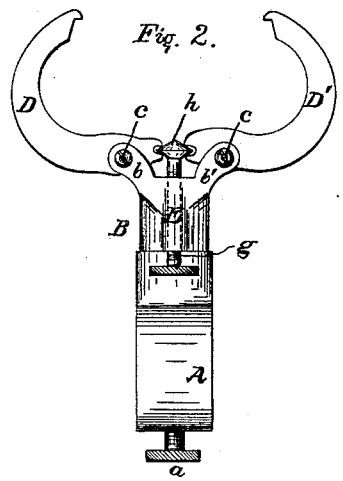
Figure 4:
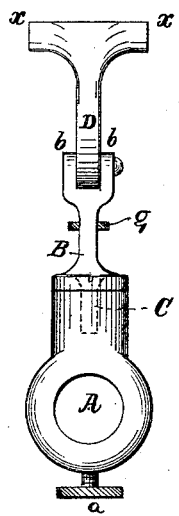
Figure 3:
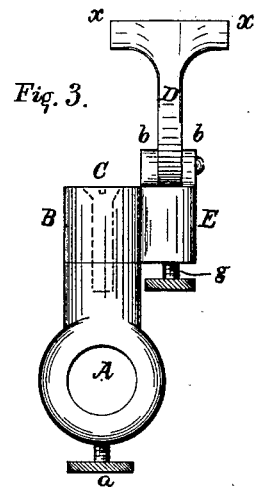
Figure 5:
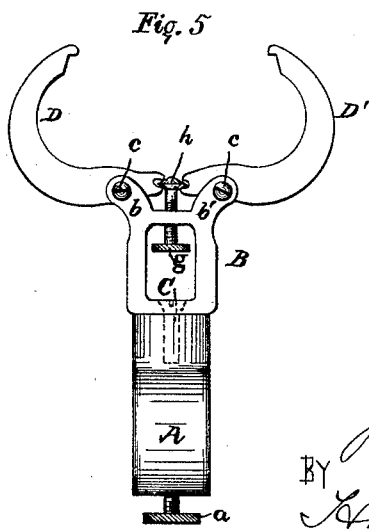

Figure 1 is a side view of one form of my shoe-rest. Fig. 2 is a side view of another form thereof. Fig. 3 is an edge view of the last. Fig. 4 is an edge view of another form of my shoe-rest. Fig. 5 is a side view of the last.

The object of my invention is to provide adjustable shoe-rests to be set on the horizontal bars of display-frames or upon standards, and which shall be capable of grasping shoes of different sizes by positive mechanism, and which is also capable of being turned about a vertical axis.

In the drawings, A represents a sliding collar or other suitable device, which may be placed upon one of the horizontal bars of any ordinary display-frame, and which can be firmly fixed thereto, as by the set-screw $a$.

B represents a frame-piece of metal, having upon it pairs of lugs $b\ b'$, through which are fastened the pivots $c\ c$ of the arms D D'.

C represents a screw (shown in dotted lines in the figures) fastening the metal frame-piece bearing the pairs of lugs to the sliding collar. This screw is so fastened into the collar that the metal piece B may turn freely around the screw as an axis.

D D' represent two arms pivoted between the pairs of lugs $b\ b'$ by the screws or rivets $c$, and having flanged ends $x\ x$, adapted to grasp the edges of the shank of a shoe. These constitute the essential features of my invention, and in the drawings I show simply details for the purpose of clamping and setting the arms or jaws D D'.

In the form of shoe-rest shown in Fig. 1 the short lever of the arm D has an extremity $d$, which extends and meshes into the cavity $d'$ in the end of the arm D'. Upon one of the arms D or D' is a lug $e$, forming substantially an extended radius of the curve of the arm, through which is tapped a hole, in which hole the set-screw $f$ moves and presses against the frame-piece B.

The operation of this form of shoe-rest is as follows: The shank of the sole of a shoe is placed between the flanges $x\ x$ of the arms D D'. Upon turning the set-screw $f$ the lug $e$ is forced away from the metal frame-piece B, and the arm revolves about the pivot $c$. The free end of the arm D' is thereby moved toward the free end of the arm D, and one side of the cavity in the other end of the arm D' presses against the projection $d$ of the arm D, and the free end of this end of this arm moving about the pivot $c$ moves toward the free end of the arm D'. This produces a clamping of the shank of the shoe between the free ends of the two arms. Unscrewing the set-screw produces the opposite motion of the jaws D D' and releases the shoe.

In the form of shoe-rest shown in Fig. 2 the frame-piece B, through which runs the swiveling screw C, has a projection E from one side, upon which projection are placed the two pairs of lugs $b\ b'$. The levers or arms D D' are pivoted to the frame-piece B by the screws or rivets $c$ in the same manner as those in the form of device just described. Perpendicularly through the projection E runs a screw $g$, the lower end of which has a milled head or thumb-piece, and the other end of which has a plate or double cone $h$ fastened upon it. The edge of this plate or double cone fits into slots cut in the short end of each of the levers or arms D D'. Turning the screw $g$ in the suitable direction will move the plate or double cone $h$, which will thereupon act upon the arms D D', opening or closing their free ends $x\ x$, thus clamping or releasing the shank of a shoe which may be placed between them.

In Figs. 4 and 5 the metal frame-piece B has a cavity cut through it in a direction at right angles to its axis. The swiveling screw C is fastened through a hole in the bottom of this cavity into the collar A, and the screw $g$, passing through a hole tapped in the upper part of the frame-piece B, has upon its end a plate or double cone $h$, which fits into slots in the short ends of the levers or arms D D' in manner similar to the form of shoe-rest last described. Turning this screw will raise or lower the plate or double cone $h$, will cause the arms D D' to move about their pivots $c\ c$, and will cause their free ends $x\ x$ to approach or separate, clamping or releasing the shank of the shoe which may be placed between them. The free ends $x\ x$ of these arms D D' are made broad, as shown in Figs. 3 and 4, in order to give a wide bearing-surface upon the edges of the shank of the shoe, and these jaws may be so formed that the upper edges $x\ x$ may either be at right angles to the plane of the arms D D', or, if so desired, may be at other angles with said plane. The jaws D D' may be made adjustable to the shoe by a spring which pulls them together, as shown in Fig. 1 by dotted lines, or by a suitable screw.

A shoe placed in my shoe-rest may be firmly fixed therein by the action of the screw $f$ or $g$, does not tend to slip, is easy to adjust to shoes of any size, and when placed upon a display-frame a shoe may be turned about in any position by reason of the frame-piece B being capable of revolution about the screw C, and the whole device being capable of revolution about a bearing of the display-frame by means of the adjustable collar A or other suitable means. I may, however, make my shoe-rest integral with the means of attaching the same to the display-frame or standard.

What I claim is—

1. In a shoe-rest for display-frames, a pair of jaws adapted to fit the edges of the shank of a shoe, each pivotally attached to a frame-piece and adapted to grasp a shoe-shank by a device jointly actuating said pair of jaws, in combination with means for adjustably affixing said frame-piece to the bars of an adjustable frame or standard, for the purpose described.

2. In a shoe-rest for display-frames, a pair of jaws adapted to fit the edges of the shank of a shoe, each pivotally attached to a frame-piece and adapted to grasp the shoe-shank by means of a suitable adjusting device, together with means for affixing said frame-piece to a display-frame or standard, for the purpose described.

3. In a shoe-rest for display-frames, a pair of jaws adapted to fit the edges of the shank of a shoe, each pivotally attached to a frame-piece and adapted to grasp the shoe-shank by means of a suitable adjusting device, said frame-piece being rotatably attached to means for affixing the same to the bars of a display-frame or standard, for the purposes described.

4. In a shoe-rest for display-frames, a pair of jaws adapted to fit the edges of a shank of a shoe, said jaws being pivotally attached opposite to each other to a frame-piece, in combination with an actuating-screw $g$, having thereon a plate or double cone $h$, fitting into slots in the ends of said jaws, in combination with means for attaching said frame-piece to a display-frame or standard, for the purposes described.

5. In a shoe-rest for standards and display-frames, and rigidly or adjustably attached to the same by suitable means, a pair of curved levers or arms D D', having on one end of each a flange $x\ x$, shaped to fit the edges of a shank of a shoe, said arms being pivoted to a frame-piece B near the other end, in combination with an actuating-screw $g$, set in the axis of said frame-piece, and provided at its extremity with a plate or double cone $h$ at right angles to the axis of the screw and engaging a slot in the short end of each of said levers or arms, for the purpose described.

6. In a shoe-rest for standards and display-frames, the combination of the arms D D', having the flange $x\ x$, and pivoted to the frame-piece B, with the screw $g$ set in a vertical screw-bearing in said frame-piece B, having on its extremity a plate $h$, engaging the slots in the short ends of said arms D D', and means for attaching said frame-piece B to a bar of a display-frame or standard, for the purposes described.

JOHN HOFMAN.

Witnesses:
C. D. KIEHEL,
H. L. OSGOOD.